United States Patent
Hofmann

[15] 3,650,626
[45] Mar. 21, 1972

[54] METHOD OF AND APPARATUS FOR THE AUTOMATIC SCANNING OF PARTS OF STEREOGRAMS BY OPTICAL COMPARISON OF THE IMAGES

[72] Inventor: Otto Hofmann, Kirchstockach, Germany

[73] Assignee: Dr. Johannes Heidenhain, Traunreut nr. Traunstein, Germany

[22] Filed: Sept. 30, 1968

[21] Appl. No.: 763,538

[52] U.S. Cl. ............................................356/2, 250/220 SP
[51] Int. Cl. .......................................................G01c 11/18
[58] Field of Search .................356/2, 167, 168; 250/220 SP

[56] References Cited

UNITED STATES PATENTS 2,871,759  2/1959  Sconce et al.............................356/2
2,933,008  4/1960  Barnett....................................356/2
3,267,286  8/1966  Bailey et al........................250/220 SP Primary Examiner—Ronald L. Wibert
Assistant Examiner—Orville B. Chew, II
Attorney—Ernest G. Montague

[57] ABSTRACT

A method of and apparatus for automatic scanning and spatial measuring of stereo image pairs, which comprises the steps of feeding together from a stereo image pair identical zones of the positive image of an exposure location and of the negative image of the other exposure location optically into a plane, and displacing the images relatively to each other or jointly by light-electric scanning and a control circuit such, that within the scanning range the light-dark contours disappear and are reduced to a minimum, respectively, the contours are present as a result of parallaxes between the negative and the positive, so that within the scanning range identical scanning spots of the negative and of the positive and a unitary gray tone are created.

12 Claims, 15 Drawing Figures

Patented March 21, 1972

INVENTOR
OTTO HOFMANN
BY
ATTORNEY.

Patented March 21, 1972

INVENTOR
OTTO HOFMANN
BY Arnold g. Montague
ATTORNEY.

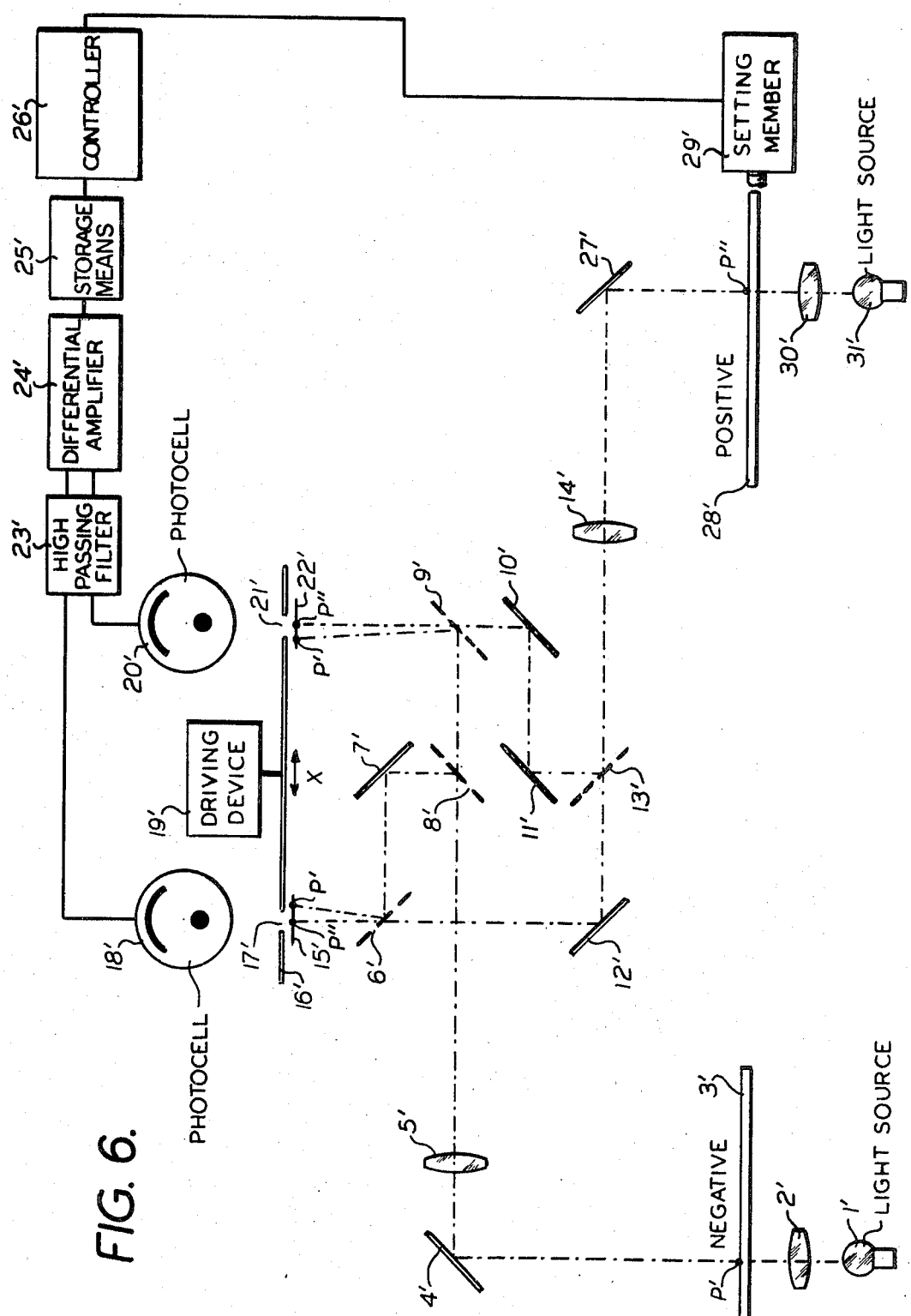

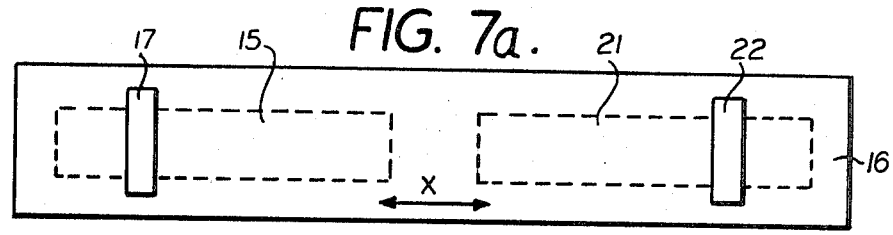
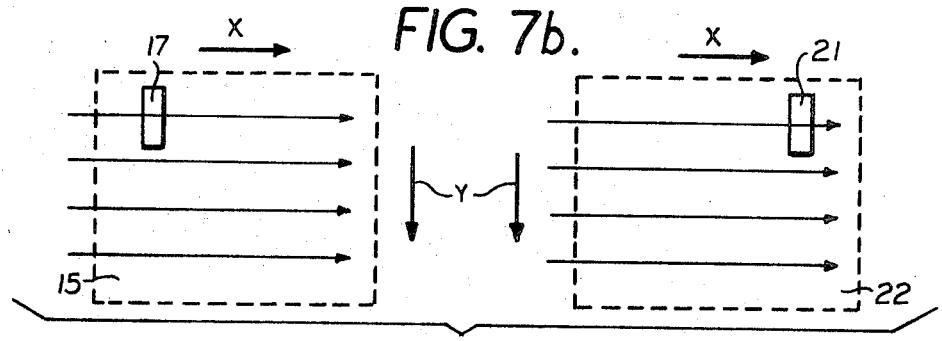
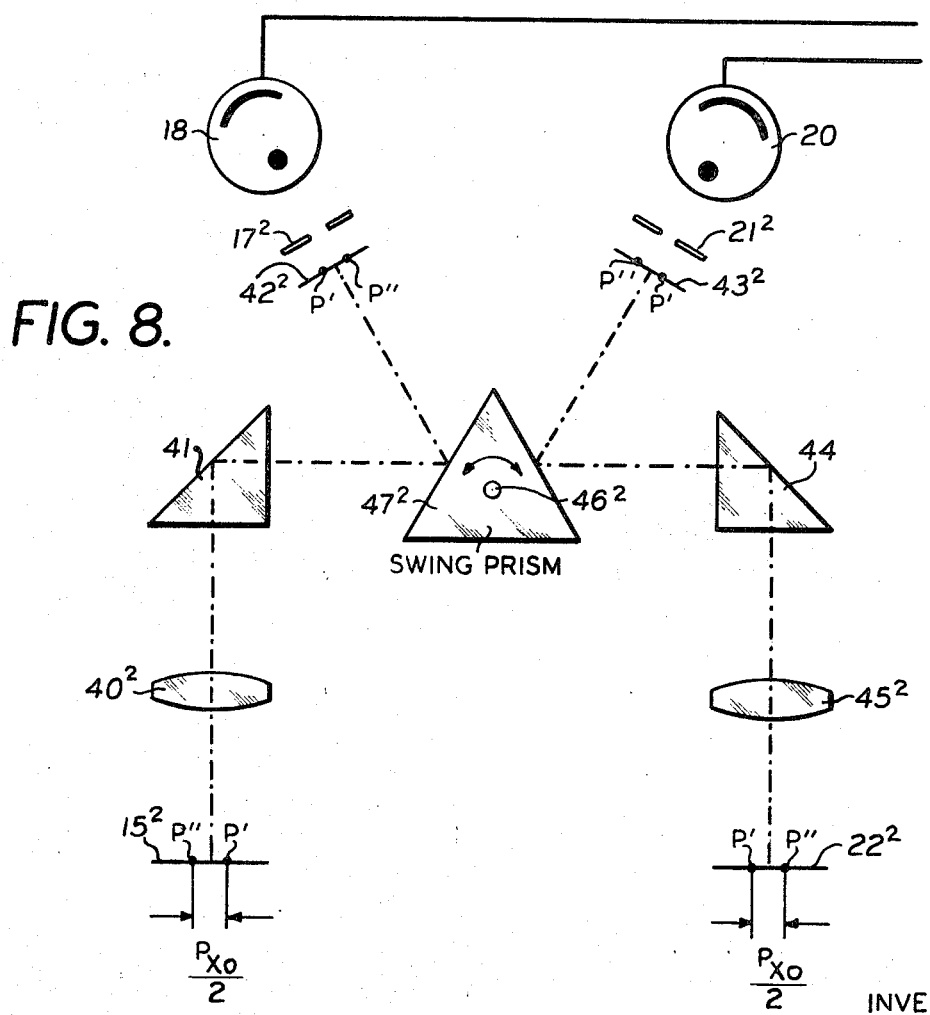

METHOD OF AND APPARATUS FOR THE AUTOMATIC SCANNING OF PARTS OF STEREOGRAMS BY OPTICAL COMPARISON OF THE IMAGES

The present invention relates to a method of and an apparatus for the automatic scanning of pairs of stereograms.

Stereophotogrammatic observation and measuring methods required, until now, a human observer, whose spatial vision capacity made possible the observation and measuring of a stereo model. For years it has been the aim of the competent device industry to replace this stereoscopic seeing ability of human beings, since in case of a satisfactory solution of this problem, for instance, the cumbersome visual measuring of stereo models, as it is conventional and necessary, particularly in the air image exploitation for the map production, could be performed appreciably faster, more conveniently and more economically by an automatic process.

Different possibilities of solutions have become known in the last years, which solutions move in the direction, that the two part images of a stereo pair are secured by synchronously moving scanning spots. Photoelectric cells register the light current modulated by the varying density of the photolayer and transform the light current into an electric signal current. The relative phase position of these two signal currents is the criterion for the parallax between both images within the scanning range. A control circle displaces the two images such that identical scanning points coincide with each other and thereby an equal phase position of the signal currents is brought about. This is identical with the disappearance of the parallax in the scanning range and corresponds with the setting process with the measuring mark in case of visual observation.

Working Principle

Starting with the prior known methods, to scan separately the images of a stereo pair, to transform the optical signals into electric signals, in order to compare then the electrical signals with each other, this object is solved in accordance with the present invention such, that the two stereo images are directly optically compared with each other, the optical parallaxes are taken off, transformed electrically and fed into a control circuit. The optical parallaxes can be produced directly such, that of the stereo image pair the positive image of one exposure place is optically joined and imaged, respectively, in a plane and brought to coincidence with the negative image of the other exposure place. In the simplest case, this occurs by superposition of the images. The parallax is thereby visible in the form of dark and light contours of the objects to be exposed. If, namely, identical scanning points and image parts, respectively, get exactly to coincidence, then by the combination of the positive with the negative within this partial coincidence zone, a nearly unitary gray tone is created. Outside of this small range, no complete covering is present, if the exposed object has depth extension and accordingly, the stereo image pair has parallax differences. Outside of the coincidence zone, thus the unitary gray tone is disturbed, positive and negative stand ajar relative to each other, and more or less sharp light-dark contours are created. To bring these light-dark contours to a minimum by variation of the parallax, thus displacement of the images or the scanning optic is the task of a photocell and of a control circuit.

During the height exploitation of the stereo model, only the x-parallax displacement is to be controlled, since the y-parallax, due to the previous orientation, is removed. This orientation process can take place in accordance with the same method of the positive-negative comparison, whereby the y-parallax is taken up and operates automatically the orientation elements.

With these and other objects in view, which will become apparent in the following detailed description, the present invention, which is shown by example only, will be clearly understood in connection with the accompanying drawings.

EXAMPLE

Figure 2A:
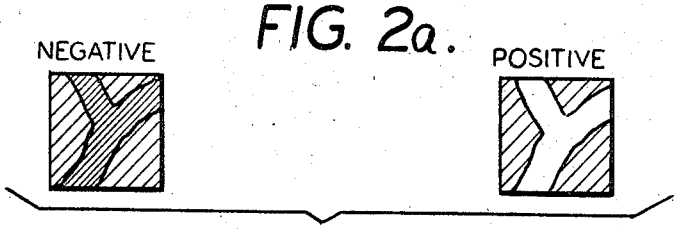
FIG. 2a is a negative image section of the left and the corresponding positive image section of the right image of a pair of stereo images.
Figure 2B:
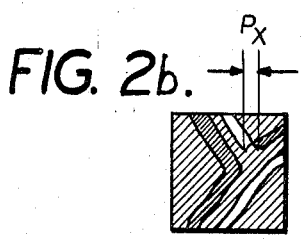
Figure 2C:
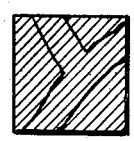
Figure 2D:
Figure 3A:
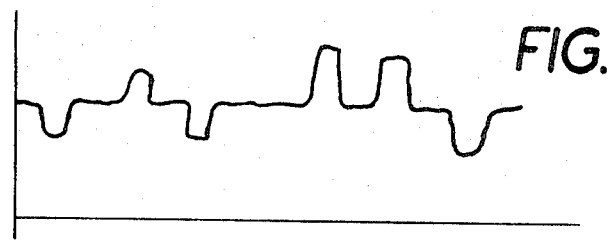
Figure 3B:
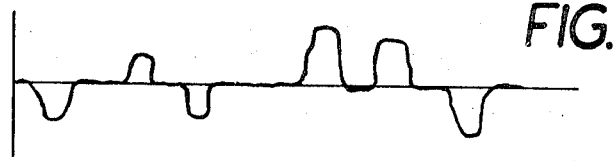
Figure 3C:
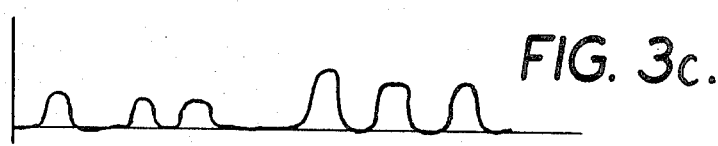
Figure 5:
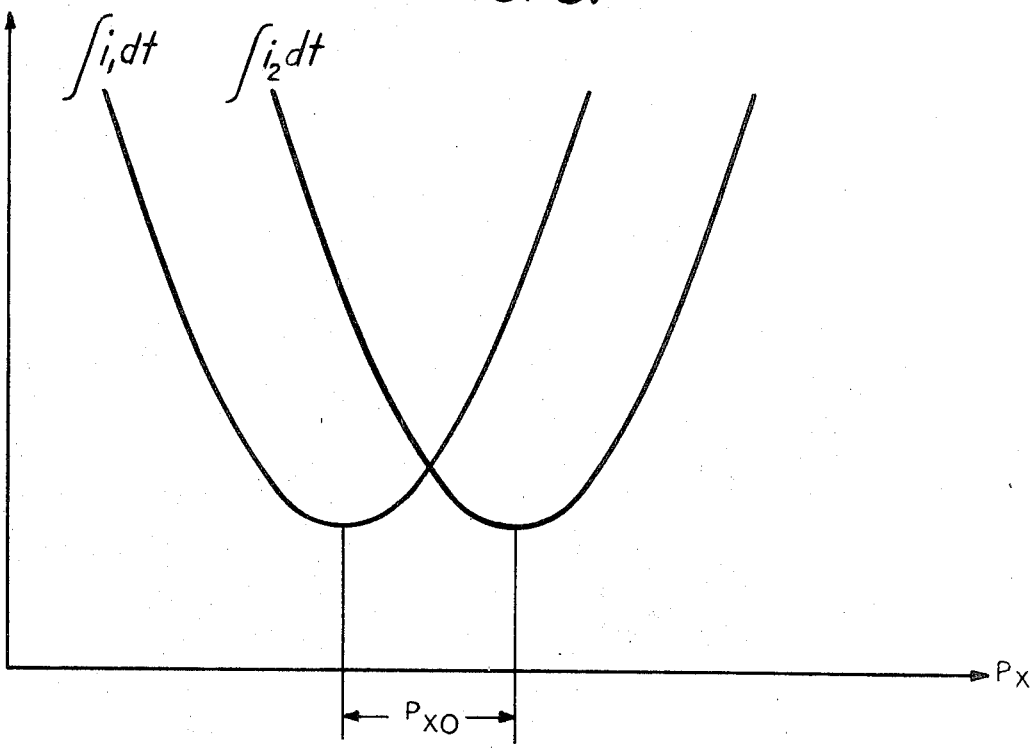
Figure 4:
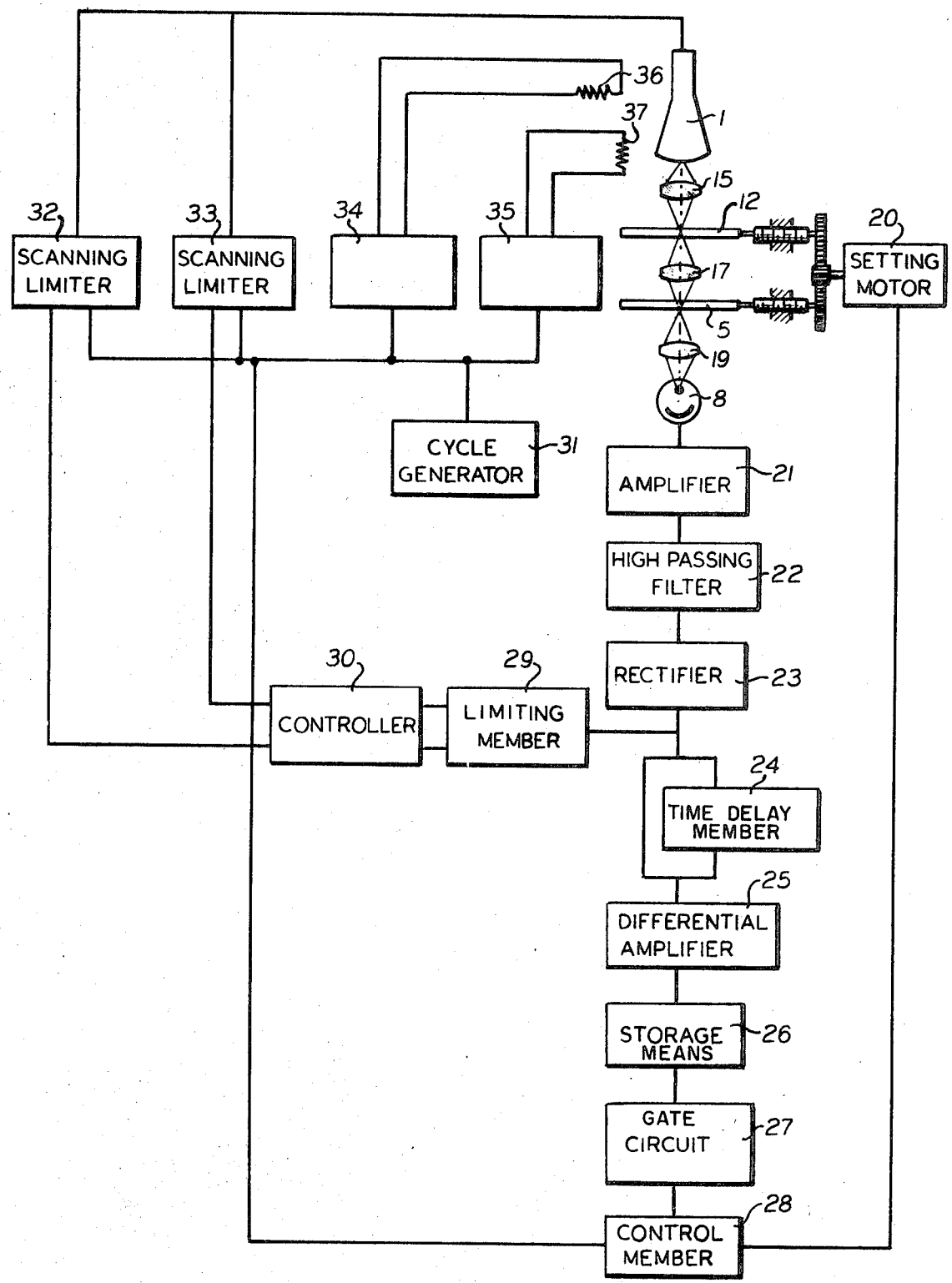

FIG. 2b discloses the optically arranged negative and positive image sections (scanning range), whereby no complete covering is present, the remaining parallax thus showing still a high setting error;

FIG. 2c discloses the optically joined positive and negative image sections in complete coincidence;

FIG. 2d shows the line scanning of the image section (scanning range) by the scanning point of the cathode ray tube;

FIG. 3a is a diagram of the signal current of the photocell;

FIG. 3b is a diagram showing the signal current of FIG. 3a after the passage of a high passing filter;

FIG. 3c discloses schematically the signal current after passage of a rectifier;

FIG. 4 is a block diagram of the entire apparatus;

FIG. 5 discloses a signal current in a double scanning;

FIG. 6 discloses the structure of a double scanning;

FIG. 7a and 7b show examples of scanning with a slit diaphragm and

FIG. 8 is a schematic view of an embodiment of scanning, whereby the image section is moved relative to the immovable slit diaphragm.

Referring now to the drawings, the present invention is disclosed in connection with a stereoscopic exploitation device with an immovable scanning optic and horizontally movable images, whereby the orientation values are recognized by analogous or digital correction devices. The optic necessary for the visual as well as for the automatic exploitation is in this case particularly simple. However, also other exploitation devices with inclinable image planes permit the accommodation to the present exploitation automatic.

Figure 1A:
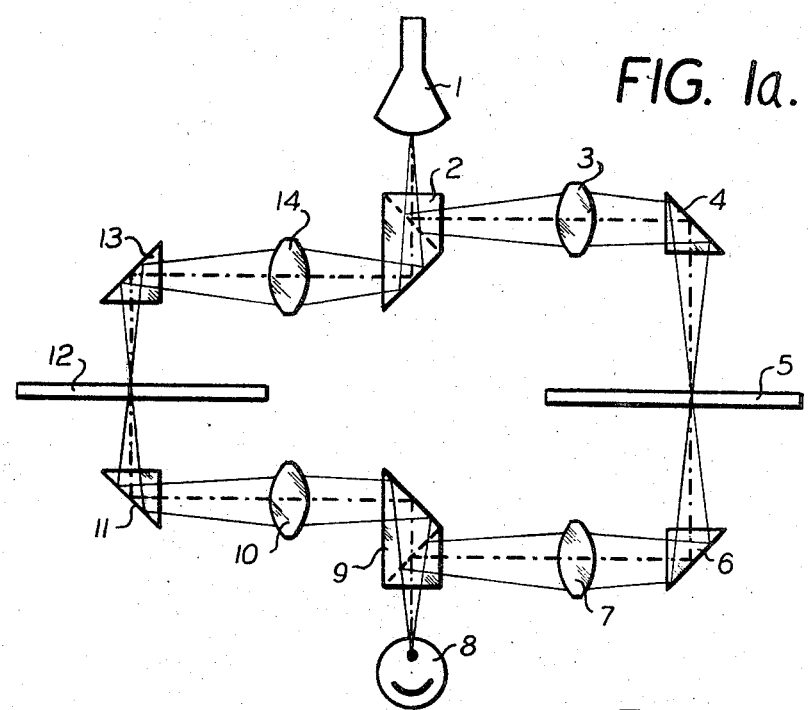
FIGS. 1a and 1b are examples of schematic showings of the particular arrangement of the stereo images.

The optical ray guidance for the automatic exploitation comprises, as shown in FIG. 1a, a cathode ray tube 1, the scanning point of which is imaged by means of a prism with a semitransparent face 2, the objective 3 and 14 and the prisms 4 and 13 onto the two images 5 and 12. Instead of a single cathode ray tube, a particular cathode ray tube can be used for each image, the rays of which, however, must by synchronized. The photographic image 5 is designated as the positive, and the photographic image 12 is designated as the negative of the stereo image pair. By means of the prisms 6 and 11, the objective 7 and 10, as well as the semitransparent face 9, the set image sections are optically joined with the scanning points and projected onto a photoelectric transducer 8. The optic is adjusted such, that the scanning points running over both images merge together again to a single scanning point.

Figure 1B:
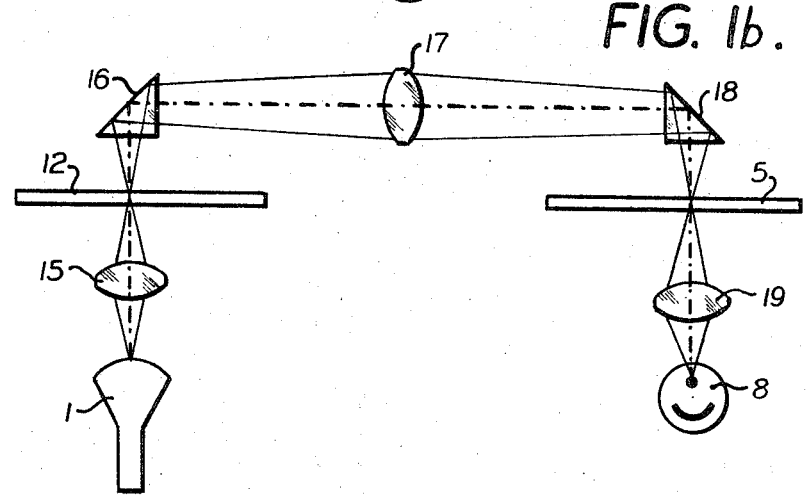

Referring now again to the drawings, and in particular to FIG. 1b, another solution is shown for the optical joining of the negative with the positive. The scanning spot produced by the cathode ray tube 1 is imaged from the objective 15 onto the positive 12, this image being imaged with the scanning spot jointly over the prism 16, the objective 17 and the prism 18 onto the negative 5, and these images thus joined with the scanning spot are thrown by means of the objective 19 onto the photoelectric transducer 8. Depending upon the density and the coincidence state of the transparent photo layers of both images, the light ray impinging upon the photoelectric transducer 8 has a greater or lesser intensity and produces a signal current, which characterizes already the parallax of the images within the scanning range (FIG. 3a).

In order to render more pronounced the occurring conditions, in FIGS. 2a, 2b, 2c, and 2d, corresponding image sections of the positive and of the negative (in the example of a fork) are strongly schematicized (a) separate, (b) at approximate coincidence, and (c) at complete coincidence. These image sections are scanned horizontally along lines (FIG. 2d). The size of the scanning face depends upon its information content and is controlled automatically to a minimum, in order to obtain a possibly punctual height setting. Since, in this automatic method, the sum of all parallaxes within the scanning range is made to a minimum, this means nothing else but that the height setting takes place to the median height of the scanning range. The smaller this scanning range, the more exact is the height setting localized.

The scanning of the coincidence zone in x-direction causes in this photoelectric transducer a photo current having a characteristic as it is shown in FIG. 3a. The light and dark stripes of the scanning zone (FIG. 2b) occurring due to the parallax constitute positive and negative modulation waves of the photo current, the median level of which corresponds with the median gray tone of the joined positive-negative pair (FIG. 2c). These positive and negative points of the photocurrent emerging from the median level are to be made by relative displacement of the images in x-direction (for the height setting) to a minimum. This takes place with a control circuit shown as a block diagram in FIG. 4.

The photoelectric transducer 8 receives via an imaging optic 19 the light current modulated by the photolayers, transforms and amplifies the light stream into an electric signal current (FIG. 3a). The signal is further amplified in an amplifier 21 and freed by a high passing filter 22 from the direct current portion (FIG. 3b). The absolute amount of the signal current is dependent upon the blackening of the negative and of the positive and with complete coincidence of both images a median gray tone results (FIG. 2c), the value of which, however, can vary over the entire stereo pair. This relatively long periodic process is disturbing for the control and is therefore rendered non-effective by the high passing filter. Only the relatively high frequency light-dark variations pass the filter 22.

The following rectifier 23 rectifies the at first still positive and negative signals (FIG. 3c). The signals run then on separate ways, once directly and the other time over a time delay member 24 into a differentiating amplifier 25. The time delay member 24 is measured such that it retards signals for a time period $\tau$, which time period corresponds with the scanning period of one run of the electron ray over all lines of the scanning field. In this manner, simultaneously only two successive signal rows run into the differentiating amplifier 25, which forms the differentiating load $$\Delta Q = Q_t + \tau - Q_t = \int_{o=t+\tau}^{\tau} i dt - \int_{o=t}^{\tau} i dt$$

of successive runs and a storage means 26, (for instance a storage means condenser), depending upon the fact whether this difference $\Delta Q$ is positive or negative, loads positive or negative. The time delay member 24 and the differentiating amplifier 25 perform, thus, a differentiation of the signal, in order to determine whether the signal sum increases or falls.

Between each run, a setting motor 20 displaces the measuring images 5 and 12 either directly (as shown in FIG. 4) or indirectly (over the space guide rods of the exploitation device by the height adjustment) relatively towards each other, thus varies the parallax, so that the load $Q_{t+1}$ is different from $Q_t$. As long as $Q_{t+1} < Q_t$ remains, that means $\Delta Q$ is negative, the parallax reduces itself and the setting motor works in the right direction. It maintains this direction of run until either the load difference $\Delta Q$ did fall below a lower threshold value $\pm \Delta Q_o$ and stands still, or becomes positive until $\Delta Q$ and reverses, by a control pulse over the gate circuit 27 and the control member 28, the running direction of the setting motor 20. The running direction of the setting motor 20 varies always then, when the parallax of a run is larger than that of the previous run of the scanning ray, it is accordingly always driven to a minimum.

If a setting motor is used as a pulse motor, then the control process runs from a central phase generator 3 in phases, whereby after each scanning period the setting motor turns for one step further, as soon as the signal threshold is surpassed. For an optimum control of the scanning face size, a second limiter 29 with a controller 30 is provided, which receives the signal still prior to the differentiation. As soon as the signal has fallen below a lower threshold value, the range of the light scanning of the cathode ray tube increases, by controlling over the vertical and horizontal scanning limiters 32 and 33 the light screening of the electron ray. If the signal surpasses an upper limit value, then the light scanning range is reduced. The variation of the scanning phase remains without influence on the scanning time of a run, which takes always a constant time period The total process of the automatic scanning takes place in the following manner: the scanning field is guided by known devices automatically in parallel strips in the shape of a meander over the stereo image pair. This takes place, for instance by a common movement of the images relative to the scanning optic, whereby the parallax setting motor 20 holds in coincidence identical image ranges of the scanning faces continuously and thereby sets permanently the parallax value and the ground height, respectively, important for the depth extension of the model. The advance in stripe direction can take place either continuously or stepwise with a pulse motor which switches over when the output signal to the setting motor 20 is zero. The width of the stripes depends on the exactness requirements, which are given to the exploitation results and upon the height differences of the object.

In the known stereoscopic analogous exploitation devices, the height adjustment of the height carriage is driven on with the setting motor, so that the latter indicates directly the model height. In this manner, the profiles of the scanned stripes are registered and one can derive therefrom, under circumstances, in suitable and known manner, a height layer line plan of the object. It is further possible to produce directly height layer lines with this process by adjusting the height carriage to the desired height in the stereoscopic exploitation device, whereby the x-parallax is retained constantly, and now the control signal affects, in known manner, two setting motors, which guide the base carriage of the exploitation device in a plan view such that the parallax remains nonvariably zero. If the apparatus is used for automatic orientation of the stereo image pairs, then it is required that in x-direction, as well as at a right angle thereto in y-direction, the parallaxes are removed. One can obtain this by a time multiplex process, by scanning the scanning range alternately in horizontal lines (x-direction) and columns (y-direction) and feeds the thus produced signal currents to a $p_x$- and $p_y$ -control circuit each and bring about thereby the necessary parallax variation in both directions. The $p_x$-control circuit controls thereby the height setting, while the $p_y$-parallax effects the orientation elements.

FURTHER IMPROVEMENT POSSIBILITIES

The method described above requires for finding the parallax minimum a dynamic process, since only timely successive scannings deliver with different parallax settings a control signal.

These difficulties are removed by a double scanning such, that two different double images are produced by optical means for the positive-negative stereo pair, whereby one combination relative to the other has a constant x-parallax displacement $p_{xo}$ by optical means. Both double images correspond with two apparently different height adjustments of the same scanning range. These two double images are scanned simultaneously by a split diaphragm pair, which are followed by two photocells. Upon variation of the height adjustment z of the exploitation device, which corresponds to an x-parallax variation, the two photocell output signals $i_1$ and $i_2$ are produced, the integrals of which $$\int i_1 dt \text{ and } \int i_2 dt$$

are equal in their run as a function of the parallax variation $p_x$, and have corresponding with the constant x-parallax displacement pair $p_{xo}$ between both double images, however, a corresponding phase displacement is shown (FIG. 5). The photo currents $i_1$ and $i_2$ and their integrals, respectively, are only equal then, when the parallax displacement in one double image combination is oppositely equal to the other, where thus both curves cross each other in FIG. 5. These facts can be interpreted such as with one measure indication pair, which has a small height adjustment, the object point is then set, when the one height marker stands far above the object point as much as the other.

This assumption applies strongly only then when the parallax signals are disposed symmetrically to the curve minimum. With sufficient approach, this assumption is correct, if $p_{xo}$ has been chosen small enough.

The exploitation of both signals is relatively simple. One guides the same suitably over a high passing filter to a differentiating amplifier which over a store condenser delivers the control deviation of a control circuit and varies as long with known means the x-parallax and thereby the height adjustment of the exploitation device, until the output signal of the differentiating amplifier and the store itself, respectively, is zero. Here also the possibility presents itself, to vary in dependency upon the size of the photocell currents the scanning range and to accommodate with an optimum the parallax information density. This can occur in simple manner by variation of the amplitude of the swinging diaphragm.

Instead of permitting swinging of the scanning diaphragm, it can be arranged immovably and the double images are permitted to swing.

FIG. 6 shows the structure of the scanning system. The stereo image pair consisting of a negative 3' and a positive 28' is imaged by means of the objectives 5' and 14' that the totally reflecting faces 4', 7', 12' and 27' and the partly mirrored faces 6', 8', 9', and 13' into both of the image planes 15' and 22' such, that always the image of the negative 3' is superimposed over that of the positive 28'. The deviating faces 6' and 9' or 10' and 12' are set such that between the double images 15' and 22' in x-direction a parallel axis shifting exists (see FIG. 7). Behind these image planes 15' and 22' a swinging diaphragm 16' with two splits 17' and 21' is arranged, which is driven by a driving device 19' and scans synchronously the double images 15' and 22'. This scanning movement of the splits takes place in the x-direction. This scanning can thereby take place either in only one line (FIG. 7a) or also by suitable formation of the diaphragm 16', the splits 17' and 21' and the driving means 19', for instance, by a Nipkow disk, in several lines (FIG. 7b).

The photocells 18' and 20' receive the alternating light current and lead the same over high passing filter 23' to a differentiation amplifier 24', the store 25' and the controller 26', which sets one image plate 28' or both image plates 3' and 28' into the x-direction by means of a setting member 29' such that the control deviation becomes zero. In stereo exploitation devices, the setting member moves the height movement of the base carriage.

The illumination of the stereo image plates takes place by means of the light sources 1' and 31', respectively, and the condensers 2' and 30', respectively. Instead of the diaphragm also the double images can be moved.

In FIG. 8, this arrangement is shown. The double images $15^2$ and $22^2$ swing over the objective $40^2$ and $45^2$, respectively, and over the swinging prism $47^2$ which swings about the axis $46^2$ into the image planes $42^2$ and $43^2$, respectively. The split diaphragms $17^2$ and $21^2$ are here rigidly provided while the double images $42^2$ and $43^2$ swing in x-direction. If a periodic movement in y-direction, (normally perpendicular to the face of the drawing) is given to the split diaphragms $17^2$ and $21^2$, then also a line scanning corresponding with FIG. 7b is possible.

ADVANTAGES OF THE OPTIC-ELECTRONIC STEREO IMAGE SCANNING

The stereo image in accordance with the present invention, can be applied particularly advantageously in connection with stereo exploitation devices with always strongly horizontal image carriers, moved measuring images and solid measuring and observation optic, since, in this case, the optical joining of the stereo images is possible simple and without movable optical intermediate members. The optical electronic stereo image scanning in accordance with the present invention has the following advantages in relation to the electronic scanning:

1. The formation of the x-parallax decisive for the height adjustment and the coordination of the stereo images relative to each other takes place directly by optical means. Exactness minimizing and expensive electronic intermediate members are not required.

2. Cathode ray tubes are completely dispensable. Thereby, all difficulties are removed which this scanning element causes, as for instance, the graining of the cathode ray scanning spot, the variation of the cathode ray tubes and their synchronization.

3. The exploitation electronic of the optically electronic stereo image scanning is simpler than the purely electronic scanning, since the signal correlation (multiplication of the signal currents $i_1$ and $i_2$) is eliminated.

These advantages result in a simpler and more exact stereo scanning.

I claim:

1. An apparatus for automatic scanning and spatial measuring of a stereo-image pair comprising a cathode ray tube having a scanning spot controlled along lines, to produce a raster beam splitting means positioned to divide said scanning spot, a first and second pair of objectives, said first pair of objectives being arranged to image said divided scanning spot in a first scanning spot bean on a photographic positive of one of said stereo-image pairs and in a second scanning spot beam on a photographic negative of the other of said stereo-image pair, beam combining means and said second pair of objectives being arranged to superimpose said first and second scanning spot beam substantially in a common plane, and a photoelectric transducer positioned in said plane for transforming said superimposed scanning spot beam into an electric signal.

2. An apparatus for automatic scanning and spatial measuring of stereo-image pairs, comprising a cathode ray tube having a scanning spot controlled along lines, a first, a second, and a third objective, as well as a photographic negative, a photographic positive, and a light-electric transducer, arranged so that said scanning point is imaged by means of said first objective onto said negative, to image the obtained image by means of said second objective onto said positive, and to image the last obtained image by means of said third objective onto said light-electric transducer.

3. In an apparatus for automatic scanning and spatial measuring of a positive and negative stereo-image, comprising a cathode ray tube producing a scanning spot controlled along lines to produce a raster, a photoelectric transducer receiving rays after passage through said positive and negative stereo-image and producing an electrical signal, an amplifier connected to said transducer, a high-pass filter connected to the output of said amplifier, a rectifier connected to the output of said filter for rectifying the signal from said filter, and a differentiating amplifier directly connected to the output of said rectifier, a time delay member connected to the output of said rectifier and to the input of said differentiating amplifier, a storage means connected to the output of said differentiating amplifier, whereby said signal is branched off and fed directly to, as well as by means of said time delay member to, said differentiating amplifier, and then to said storage means.

4. The apparatus, as set forth in claim 3, which comprises further a gate circuit connected to said storage means, a control member connected to the output of said gate circuit, and a setting motor means for adjusting the relative positions of said positive and negative stereo-image and operatively connected to said control member, such that said control member controls said setting motor means such that identical scanning points coincide in the scanning range.

5. The apparatus, as set forth in claim 3, which comprises further a limiting member connected to the output of said rectifier, a controller connected to the output of said limiting member, and said limiting member and said controller operatively connected for reducing the light scanning range of said cathode ray tube upon surpassing an upper limit of the rectified signal current, and enlarging the light scanning range of said cathode ray tube, without variation of the scanning time period of one run, upon falling below a lower limit of said signal current.

6. An apparatus for automatic scanning and spatial measuring of a stereo image pair comprising a photographic positive of one of said stereo image pair and a photographic negative of another of said stereo image pair, light sources directing light respectively onto said photographic positive and said photographic negative, optical means producing from said light leaving said photographic negative and said photographic positive two double images each having a component of light from said photographic positive and from said photographic negative, an optical deviating means for causing a constant x-parallax displacement of one of said double images relative to the other of said double images, a split diaphragm for each of said double images and means for moving the former relative to the latter for scanning the latter, and photocells receiving the scanned double images, and for transforming the latter into electric currents.

7. The apparatus, as set forth in claim 6, which includes a differentiating amplifier operatively connected to the outputs of said photocells, a storage means connected to the output of said differentiating amplifier, a controller connected to the output of said storage means, a setting member connected to the output of said controller and to at least one of said photographic positive and photographic negative.

8. The apparatus, as set forth in claim 7, which includes means for a synchronously moving both of said split diaphagms.

9. An apparatus for automatic scanning and spatial measuring of a stereo-image pair comprising two cathode ray tubes each having a scanning spot controlled along lines to produce two rasters running synchroneously, a first and second pair of objectives, said first pair of objectives being arranged to image one of said scanning spot in a first scanning spot beam on a photo graphic positive of one of said stereo-image pair and the other of said scanning spot in a second scanning spot beam on a photographic negative of the other of said stereo-image pair, beam combining means and said second pair of objectives being arranged to superimpose said first and second scanning spot beams substantially in a common plane, and a photoelectric transducer positioned in said plane for transforming said superimposed scanning spot beam into an electric signal.

10. A method for automatic scanning and spatial measuring of a stereo-image pair, comprising the steps of producing two scanning spot beams running synchroneously relative to each other, optically imaging one of said scanning spot beams on a photographic positive of one of said stereo-image pair and optically imaging the other of said scanning spot beams on a photographic negative of the other of said stereo-image pair, superimposing said scanning spot beams substantially in a common plane, and transforming said superimposed scanning spot beam into an electric signal, and adjusting said photographic positive and said photographic negative of said stereo-image pair relative to each other by said electric signal.

11. The method, as set forth in claim 10, wherein said adjusting comprises adjusting said photographic positive and said photographic negative such that light-dark contours of said superimposed image substantially disappear and are reduced to a minimum.

12. A method for automatic scanning and spatial measuring of a stereo-image pair comprising the steps of directing light onto a photographic positive and a photographic negative, dividing and directing the light leaving said photographic positive and said photographic positive to produce two double images each having light from both said photographic positive and said photographic negative as well as to optically cause a constant x-parallax displacement of one of said double images relative to the other of said double images, scanning said double images simultaneously by a split diaphragm pair, producing corresponding photo electrical signals from said scanned double images, and adjusting the photographic positive and the photographic negative in accordance with said photo electrical signals.

* * * * *